Patented Nov. 17, 1931

1,832,428

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SEPARATION OF GASEOUS OR LOW-BOILING UNSATURATED HYDROCARBONS

No Drawing. Application filed March 15, 1928, Serial No. 262,037, and in Germany March 19, 1927.

This invention relates to the separation into their components of gaseous or low-boiling olefines and butadiene from mixtures thereof either with one another, or with other organic substances of low-boiling point range.

When cracking organic products, such as petroleum, brown-coal, brown-coal tar, cyclic paraffins, and the like, in the presence or absence of additional gases or vapors such as steam, hydrogen, nitrogen, carbon dioxid and the like, a mixture of olefines and butadiene is frequently obtained, gaseous at ordinary temperature, or of low boiling point, the separation of which into its components is difficult even by strong cooling, as the boiling points of the said olefines and butadiene lie very close together for example in the case of β-butylene and butadiene, the boiling points of which are 1° C. and 5° C. below zero respectively.

We have now found that the separation into their components of such mixtures of olefines and butadiene of low boiling point with or without other organic substances of low boiling point for example hydrocarbons acting as solvents into their components may be effected in a very simple manner by subjecting them to fractional distillation under elevated pressure. In this case nearly all the olefines and butadiene contained therein boil at so high temperatures that simple water-cooling is sufficient, and moreover, the difference between the boiling points of the several components is increased, so that fractionation is substantially facilitated.

For example, a mixture of olefines and butadiene obtained by the pyrogenic decomposition of cyclohexane and its homologues, and containing ethylene, propylene, butylene and butadiene, may be easily separated in the manner herein described, after having been liquefied by compression, with or without the aid of hydrocarbons acting as solvents, which method, however, may also be employed with advantage in many other cases. In most cases it is unnecessary to carry out the distillation under very high pressures, about 5 to 10 atmospheres being generally sufficient though higher or lower pressures may be employed if required.

The distillation is advantageously carried out by vaporizing the mixture to be treated under pressure, and introducing the vapors at the bottom of a fractionating column the vapors being passed upwards therein, and withdrawing the vapors at one or more higher points of the column. The process may also be carried out continuously by employing several fractionating columns maintained at different temperatures, and each consecutive column being maintained at a lower pressure than the preceding one. In this way for example the separate components ethylene, propylene, butylene and butadiene are easily separated in three columns.

The following examples will further illustrate the nature of the said invention, which however is not limited thereto.

Example 1

By the decomposition of cyclohexane, by passing the vapors thereof through a tube lined with quartz or fire-brick and filled with calcium aluminate in cube form, at about 600° C., a mixture is obtained which contains about 28 parts by weight of ethylene, 14 parts by weight of propylene, 4 parts by weight of butylene and 40 parts by weight of butadiene. The mixture is liquefied by compression, introduced into a still connected with a fractionating column several metres in height capable of resisting pressure, and expanded, at room temperature, down to a pressure of 15 atmospheres. In this stage, ethylene alone is liberated. Heat is then applied, and expansion gradually continued. Propylene distils over at 25° C., when the pressure reaches 12 atmospheres and is easily obtained as a 98 per cent product. To separate butadiene (boiling point 5° C. below zero at 1 atmosphere) the temperature in the still is allowed to rise to about 50° C. and the expansion is carried further. When expanding down to about 6 atmospheres an intermediate fraction containing 50 per cent of butadiene is obtained. At 5 atmospheres and 45° C. the bulk of the butadiene passes over as an approximately 98 per cent product. Maintaining the same pressure and rate of distillation the temperature is then gradually raised, an intermediate fraction being collected, and finally, at 5 atmospheres and 52° C., practically pure butylene is obtained.

*Example 2*

A mixture of a liquefied cracking gas, consisting of about 70 per cent of butylene, butadiene, propylene and cracked products of higher boiling point, 20 per cent of ethylene and 10 per cent of methane, ethane and hydrogen is filled under a pressure of 50 atmospheres into an apparatus suitable for pressure distillation. In order to separate the methane and the hydrogen on the one hand, and the ethylene on the other, the temperature of the dephlegmator is maintained, for example, with the aid of an ammonia-refrigerating plant at about 20° C. below zero and the pressure is gradually reduced from 50 atmospheres to 40 atmospheres. A gas is evolved consisting for the most part of hydrogen and methane. On relieving the pressure further, a gas is obtained consisting up to about 90 per cent of ethylene. Since propylene only distils off at about 12 atmospheres and room temperature, the pressure is only relieved to about 15 atmospheres, without any appreciable amounts of propylene distilling over, and about 95 per cent of the ethylene present in the mixture is at once obtained thereby as a product of about 80 per cent strength. The ethylene is practically free from propylene and contains as a by-product about 10 per cent of ethane. Practically all the propylene, butylene, and butadiene is contained in the residue, the separation of which may also be effected by distillation under pressure.

What we claim is:

1. The process for the separation into its components of a mixture of ethylene, propylene, butylene and butadiene, which comprises liquefying the mixture by compression, expanding down to a pressure of 15 atmospheres at room temperature to liberate ethylene, applying heat and gradually expanding down to 12 atmospheres to liberate propylene, thereupon gradually raising the temperature to about 45° C. and relieving the pressure to about 5 atmospheres to liberate butadiene and finally raising the temperature to about 52° C.

2. The process for the separation into its components of a mixture of ethylene, propylene, butylene and butadiene, which comprises liquefying the mixture by compression combined with the action of hydrocarbons acting as solvents, expanding down to a pressure of 15 atmospheres at room temperature to liberate ethylene, applying heat and gradually expanding down to 12 atmospheres to liberate propylene, thereupon gradually raising the temperature to about 45° C. and relieving the pressure to about 5 atmospheres to liberate butadiene and finally raising the temperature to about 52° C.

3. A process for isolating substantially pure butadiene from a liquid mixture thereof with butylene which comprises subjecting said mixture to distillation under an elevated pressure of about 5 atmospheres and at a temperature of about 45° C.

4. A process for separating a mixture of hydrocarbons containing butadiene and butylene into its components which comprises subjecting said mixture to fractional distillation in stages under an initial pressure of about 15 atmospheres and at room temperature, thereafter gradually decreasing the pressure by successive stages and increasing the temperature with each successive decrease in pressure to drive off the various hydrocarbons in respective stages, the final stage being effected at about 52° C. and a pressure of about 5 atmospheres.

In testimony whereof we have hereunto set our hands.

OTTO SCHMIDT.
OTTO GROSSKINSKY.